United States Patent [19]
Shimomura et al.

[11] Patent Number: 5,114,184
[45] Date of Patent: May 19, 1992

[54] AUTOMOBILE REAR BODY STRUCTURE

[75] Inventors: Takeshi Shimomura; Katumi Sakane; Makoto Tokuda; Sinpei Egawa, all of Hiroshima, Japan

[73] Assignee: Mazda Motor Corporation, Hiroshima, Japan

[21] Appl. No.: 547,150

[22] Filed: Jul. 3, 1990

[30] Foreign Application Priority Data

Jul. 3, 1990 [JP] Japan ................... 1-171389

[51] Int. Cl.⁵ .................................. B62D 21/15
[52] U.S. Cl. .................... 280/784; 280/834; 296/195
[58] Field of Search ............ 280/784, 791, 781, 834; 296/188, 189, 204, 195, 203; 180/69.4

[56] References Cited

U.S. PATENT DOCUMENTS

| | | |
|---|---|---|
| 2,311,880 | 2/1943 | Sherman ................ 280/834 |
| 2,883,232 | 4/1959 | Olley ................... 296/204 |
| 3,054,636 | 9/1962 | Wessells, III . |
| 3,108,836 | 10/1963 | Deckert . |
| 3,171,669 | 3/1965 | Barenyi . |
| 3,661,419 | 5/1972 | Mitamura et al. . |
| 3,811,698 | 5/1974 | Glance ................. 280/784 |
| 3,827,712 | 8/1974 | Suzuki et al. . |
| 3,896,896 | 7/1975 | Saitoh . |
| 4,093,254 | 6/1978 | Ezaki . |
| 4,098,520 | 7/1978 | Ezaki et al. . |
| 4,106,807 | 8/1978 | Sakurai ................ 296/204 |
| 4,152,012 | 5/1979 | Reidelbach et al. . |
| 4,369,981 | 1/1983 | Chiba et al. . |
| 4,401,341 | 8/1983 | Hirabayashi .......... 296/195 |
| 4,416,461 | 11/1983 | Hayashi et al. . |
| 4,557,519 | 12/1985 | Matsuura . |
| 4,684,151 | 8/1987 | Drewek . |
| 4,708,391 | 11/1987 | Nakano . |
| 4,950,031 | 8/1990 | Mizunaga et al. . |

FOREIGN PATENT DOCUMENTS

| | | |
|---|---|---|
| 2509351 | 9/1975 | Fed. Rep. of Germany . |
| 1130427 | 8/1955 | France . |
| 59-11971 | 1/1984 | Japan ................... 296/195 |
| 60-15272 | 1/1985 | Japan . |
| 60-45484 | 3/1985 | Japan . |
| 61-287822 | 12/1986 | Japan . |
| 62-26171 | 2/1987 | Japan ................... 296/188 |
| 62-35643 | 9/1987 | Japan . |
| 63-89829 | 6/1988 | Japan ................... 280/834 |
| 2160834 | 1/1986 | United Kingdom ... 280/834 |

Primary Examiner—Charles A. Marmor
Assistant Examiner—Karin Tyson
Attorney, Agent, or Firm—Wenderoth, Lind & Ponack

[57] ABSTRACT

An automobile rear body structure includes a pair of rear side frames extending in a direction longitudinally of a vehicle body and having respective kick-up portions, each of which extends diagonally upwardly and rearwardly to form a bridging portion in a rear wheel zone. A differential unit is disposed substantially between the kick-up portions and a fuel tank is disposed behind the differential unit. A pair of drive shafts for driving respective rear wheels extend transversely from the differential unit and are disposed substantially below the kick-up portions. A medial cross member is interposed between the differential unit and the fuel tank and extends transversely between the paired rear side frames. The cross member has opposite ends connected to the rear side frames at locations immediately behind the kick-up portions. The differential unit is secured to the cross member or a suspension cross member for carrying rear wheel suspension systems. The suspension cross member extends transversely between the rear side frames and is secured to a lower surface of the medial cross member.

9 Claims, 6 Drawing Sheets

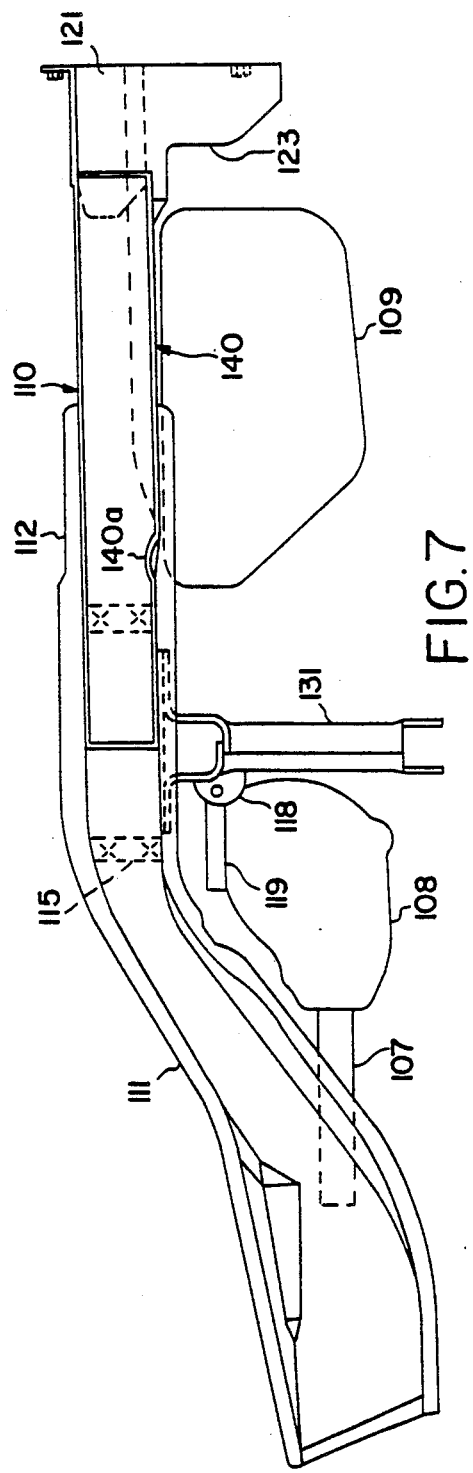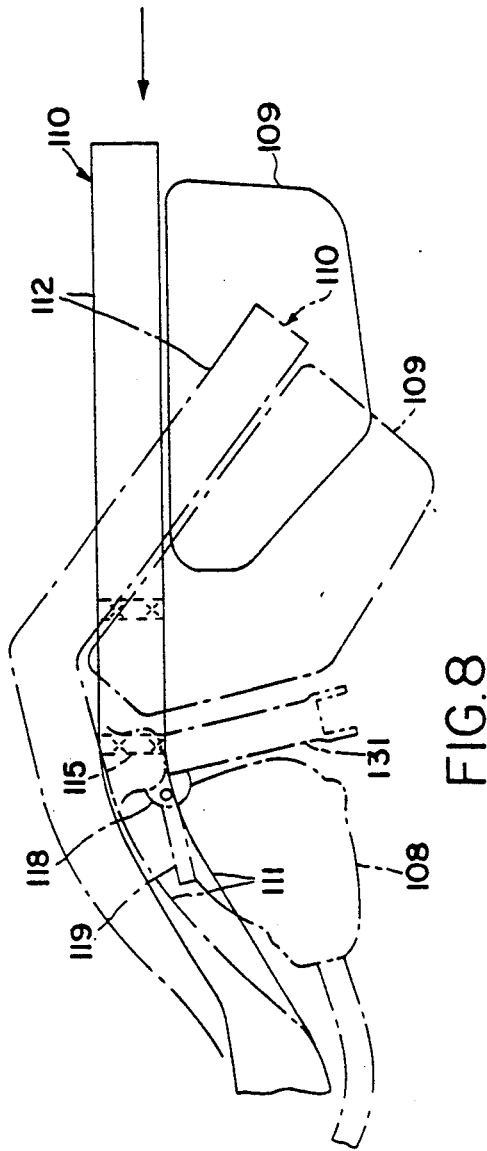

AUTOMOBILE REAR BODY STRUCTURE

BACKGROUND OF THE INVENTION

1. Field of the Invention

The present invention generally relates to an automobile body structure, and more particularly, to an automobile rear body structure.

2. Description of the Prior Art

Japanese Utility Model Laid-open Application No. 63-89829 discloses an automobile rear body structure, as shown in FIG. 1, which comprises a pair of spaced rear side frames 1 extending in a direction longitudinally of a vehicle body and a rear cross member 3 extending transversely between the rear side frames 1 and having opposite ends connected to rear ends of the rear side frames 1. A differential unit 2 is disposed between the rear side frames 1 and a fuel tank 4 is disposed between the differential unit 2 and the rear cross member 3.

When the rear of an automobile vehicle having the above-described structure is struck by another automotive vehicle, the rear cross member 3 is deformed frontwardly, thereby pushing the fuel tank 4. In this event, if the fuel tank 4 strikes the differential unit 2, the fuel tank 4 is likely to be damaged.

SUMMARY OF THE INVENTION

Accordingly, the present invention has been developed to substantially eliminate the above-described disadvantage inherent in the prior art automobile rear body structure, and has as its essential object to provide an improved automobile rear body structure, in which a fuel tank never strikes a differential unit in the event of a rear-end collision or the like, thereby preventing any possible damage to the fuel tank.

In accomplishing this and other objects, an automobile rear body structure according to the present invention comprises a pair of rear side frames extending in a direction longitudinally of a vehicle body and having respective kick-up portions, each of which extends diagonally upwardly and rearwardly to form a bridging portion in a rear wheel zone. A differential unit is disposed substantially between the kick-up portions and a fuel tank is disposed behind the differential unit. A pair of drive or axle shafts for driving respective rear wheels extend transversely from the differential unit and are disposed substantially below the kick-up portions. The structure according to the present invention further comprises a medial cross member interposed between the differential unit and the fuel tank and extending transversely between the paired rear side frames. Opposite ends of the medial cross member are connected to the rear side frames at locations immediately behind the kick-up portions.

The differential unit is generally secured to the medial cross member or to a suspension cross member for carrying rear wheel suspension systems. The suspension cross member extends transversely between the rear side frames and is secured to a lower surface of the medial cross member.

Preferably, a reinforcing member is rigidly secured to a straight portion formed at the rear of each rear side frame to reinforce the straight portion.

When an automobile vehicle having the above-described structure is subjected to a rear-end collision, each of the rear side frames is liable to be bent at a location in front of the fuel tank because this location is relatively low in strength and rigidity.

Accordingly, the medial cross member or the suspension cross member pushes frontwardly the differential unit secured thereto, thereby preventing the fuel tank from striking the differential unit.

BRIEF DESCRIPTION OF THE DRAWINGS

This and other objects and features of the present invention will become more apparent from the following description of preferred embodiment thereof with reference to the accompanying drawings, throughout which like parts are designated by like reference numerals, and wherein:

FIG. 7 is a schematic side elevational view of the rear body structure of FIG. 6;

FIG. 8 is a schematic side elevational view of the rear body structure of FIG. 6 in the event of a rear-end collision;

DETAILED DESCRIPTION OF THE PREFERRED EMBODIMENTS

Figure 1:
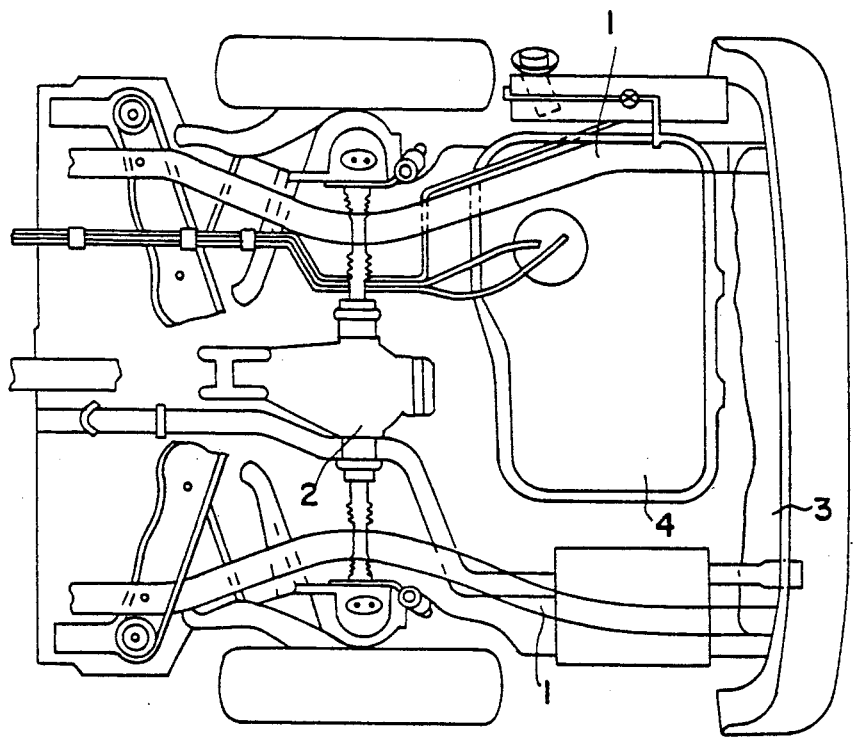
FIG. 1 is a top plan view of a conventional automobile rear body structure.
Figure 2:
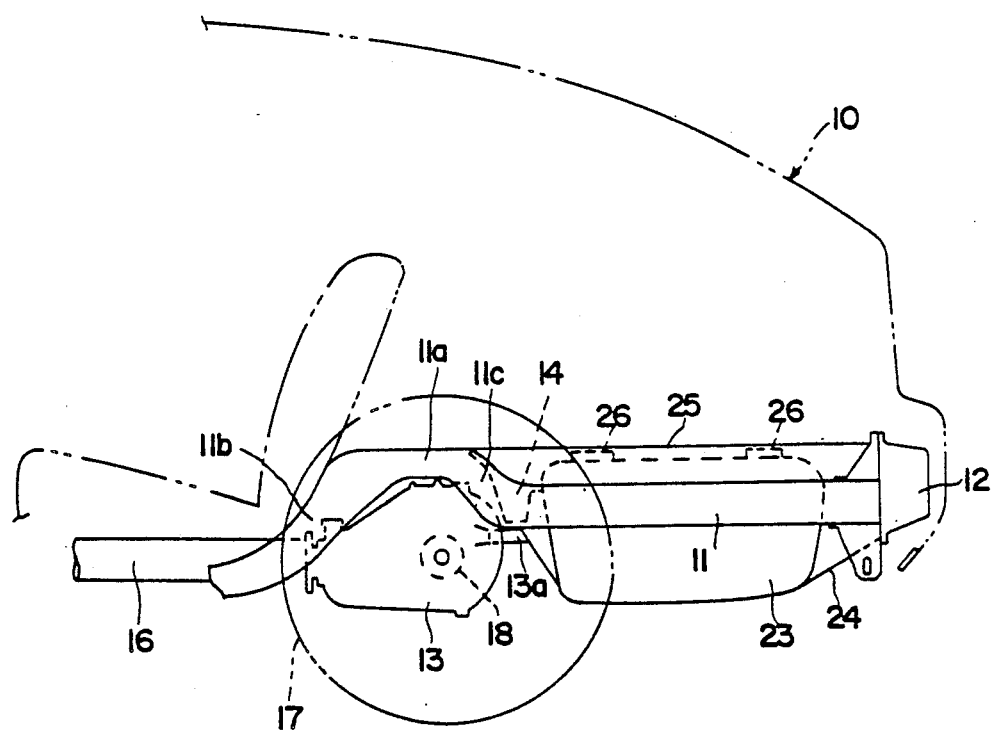
FIG. 2 is a side elevational view of an automobile rear body structure according to a first embodiment of the present invention.
Figure 3:
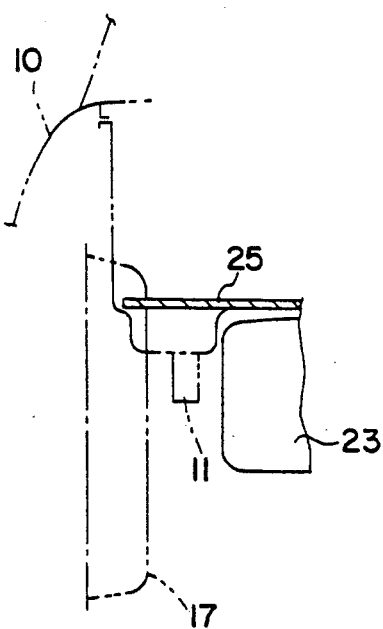
FIG. 3 is a schematic fragmentary rear elevational view of the structure of FIG. 2.
Figure 4:
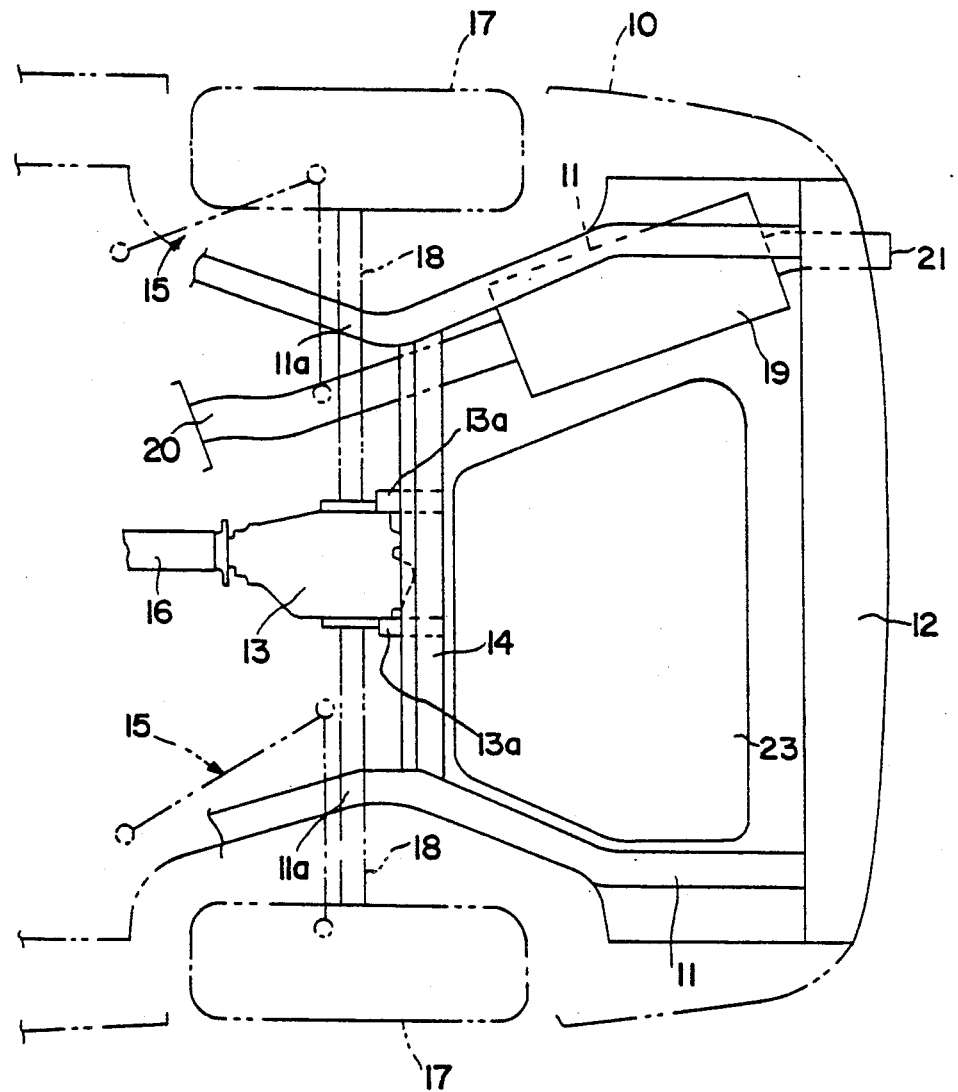
FIG. 4 is a top plan view of the rear body structure of FIG. 2.

FIGS. 2 to 4 depict an automobile rear body structure according to the first embodiment of the present invention, which comprises a pair of spaced rear side frames 11 extending in a direction longitudinally of a vehicle body 10, a rear cross member 12 extending in a direction transversely of the vehicle body 10 and having opposite ends connected to rear ends of the rear side frames 11, and a medial cross member 14 extending transversely between the rear side frames 11 in parallel with the rear cross member 12 and having opposite ends connected to the rear side frames 11.

A differential unit 13 is disposed in front of the medial cross member 14 and is connected to a drive shaft 16 extending frontwardly therefrom and to two drive or rear axle shafts 18 for driving respective rear wheels 17. Both the rear wheels 17 are supported on the vehicle body 10 by means of respective suspension mechanisms 15.

Below the right-hand rear side frame 11 is disposed a silencer or muffler 19, which is connected at its front end to an exhaust pipe 20 and at its rear end to a tail pipe 21.

A fuel tank 23 is disposed between the rear cross member 12 and the differential unit 13. The fuel tank 23 is securely held by a plurality of bands 24 stretched between the cross members 12 and 14 and is biased towards a floor panel 25 securely mounted on the upper surfaces of the rear side frames 11. A plurality of rubber spacers 26 are interposed between the fuel tank 23 and the floor panel 25.

In this embodiment, since the height of the vehicle body 10 is relatively low, the rear side frames 11 are disposed below the floor panel 25. Accordingly, as clearly shown in FIG. 2, the rear side frames 11 are provided with respective upwardly curved portions or bridging portions 11a, which are formed in front of joints between the rear side frames 11 and the medial cross member 14. More specifically, each of the rear side frames 11 rises diagonally toward the rear to form a kick-up portion 11b in a rear wheel zone and therebehind has a medial kick-down or depressed portion 11c extending diagonally downwardly and rearwardly from the kick-up portion 11b so that the rear side frames 11 may bridge respective drive shafts 18. The upwardly curved portions 11a are further curved inwardly, as clearly shown in FIG. 4. The cross member 14 confronts a rear portion of the differential unit 13 and a rear flange 13a of the latter is securely mounted on the lower surface of the former by means of bolts or any other suitable means.

Figure 5:
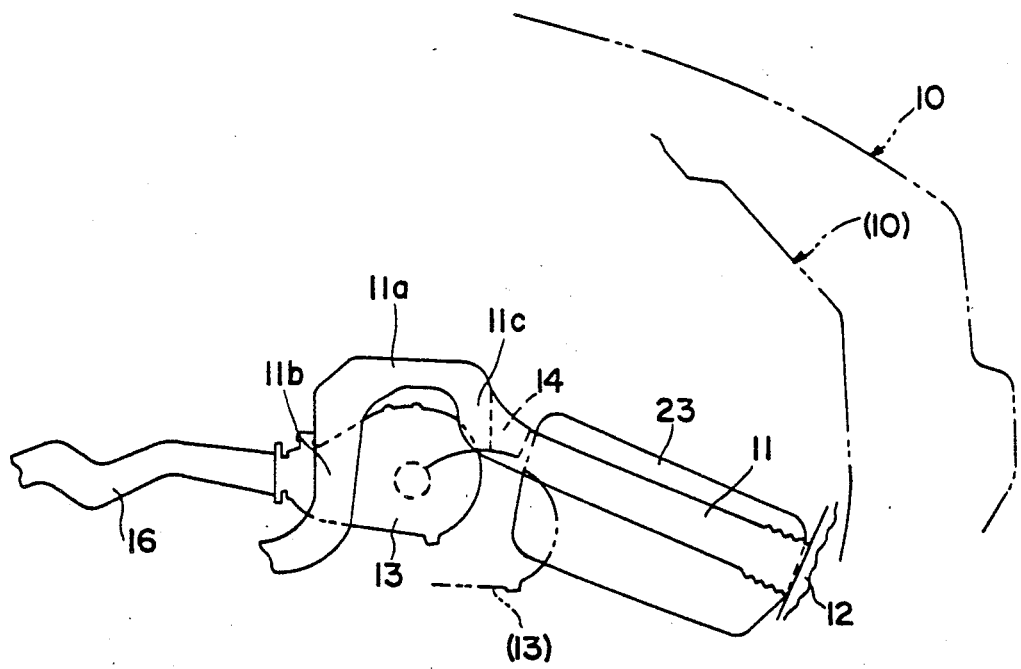
FIG. 5 is a schematic side elevational view of the rear body structure of FIG. 2 in the event of a rear-end collision.

FIG. 5 depicts the state of a crushed rear body structure in the event of a rear-end collision.

In FIG. 5, the rear cross member 12 is considerably damaged and the rear portion of the vehicle body 10 is crushed inwardly, thereby imposing a frontwardly directed impact load upon the rear side frames 11. In this event, the upwardly curved portions 11a of the rear side frames 11 are bent upwardly because these portions are relatively low in strength.

Furthermore, the medial cross member 14, which is high in strength, is diagonally upwardly and frontwardly moved along with the rear side frames 11, thereby pushing the differential unit 13 secured to the medial cross member 14 in the same direction from a location as indicated by double-dotted chain lines in FIG. 5 to another location as indicated by solid lines.

As a result, even if the fuel tank 23 is strongly pushed frontwardly by the rear cross member 12, the fuel tank 23 never strikes the differential unit 13.

In addition, the impact load is absorbed by the bending action of the upwardly curved portions 11a of the rear side frames 11.

Although the differential unit 13 is mounted on the medial cross member 14 in the above-described embodiment, the former can be mounted on a member other than the latter.

Figure 6:
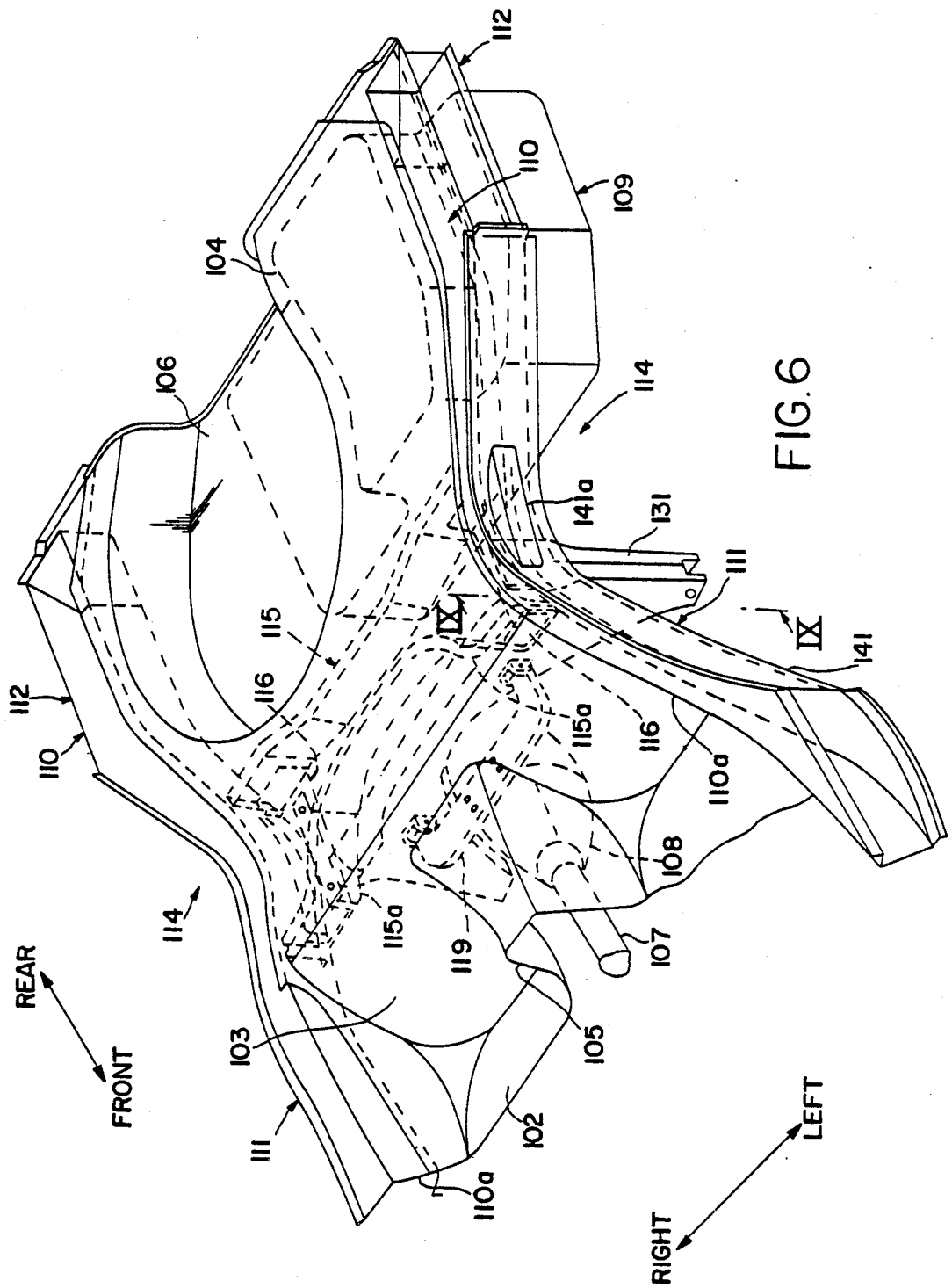
FIG. 6 is a perspective view of an automobile rear body structure according to a second embodiment of the present invention.

FIG. 6 depicts a rear body structure according to the second embodiment of the present invention.

In this embodiment are illustrated a passenger compartment floor panel 102 forming a floor of a passenger compartment, a kick-up panel 103 extending diagonally upwardly and rearwardly from the passenger compartment floor panel 102, and a rear floor panel 104 forming a floor of a baggage compartment. These panels 102-104 are generally formed as a unitary structure and opposite sides thereof are rigidly secured to a pair of rear side frames 110 extending in a direction longitudinally of a vehicle body.

The passenger compartment floor panel 102 has a longitudinally extending tunnel 105 through which a drive shaft 107 extends. The rear floor panel 104 has a substantially circular recess 106 for accommodating a spare tire (not shown). A fuel tank 109 having an upwardly protruding portion so formed as to correspond to the configuration of the rear floor panel 104 is securely mounted on the lower surface of the rear floor panel 104.

In a manner similar to the first embodiment, the rear side frames 110 are connected at their rear ends to a transversely extending rear cross member 121 and are curved inwardly in a rear wheel zone defined in front of the fuel tank 109. These inwardly curved portions 114 are rigidly secured to opposite ends of a transversely extending medial cross member 115.

The medial cross member 115 has a substantially U-shaped cross section which is preferably orientated with its open end upward as shown in FIG. 6. The opposite ends of the medial cross member 115, to which the rear side frames 110 are secured, are widened to strengthen and rigidify the joints between the cross member 115 and the rear side frames 110. On these widened portions 115a are mounted nut plates 116 for mounting a rear suspension cross member 131, which extends below and along the medial cross member 115 and carries rear wheel suspension systems.

Figure 9:
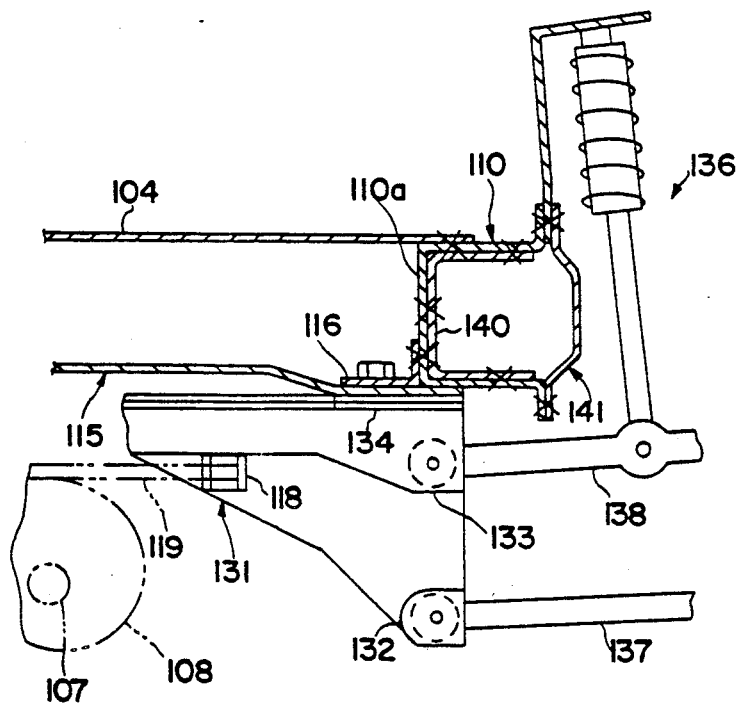
FIG. 9 is a sectional view taken along line IX—IX in FIG. 6.
Figure 10:
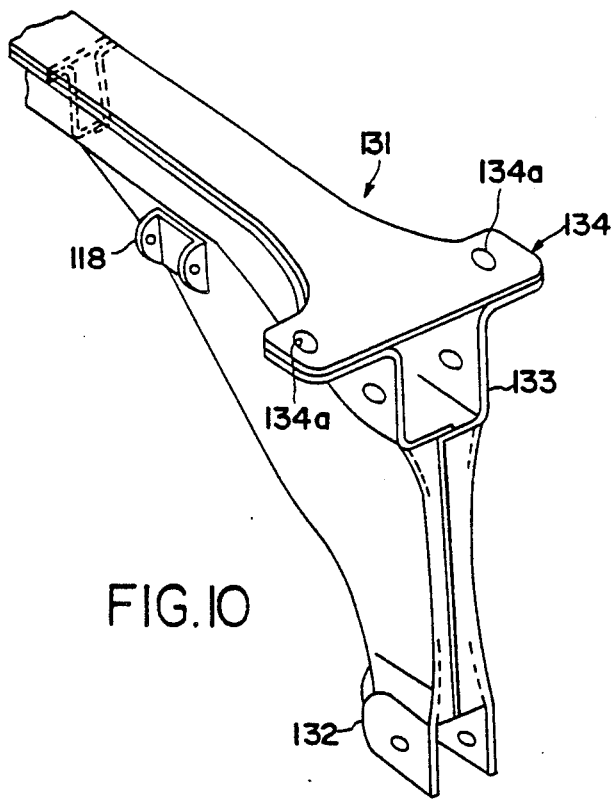
FIG. 10 is a fragmentary perspective view of a suspension cross member provided in the rear body structure of FIG. 6.

As shown in FIGS. 9 and 10, opposite ends of the rear suspension cross member 131 further extend downwardly. Each of such downwardly extending portions comprises a lower arm support portion 132 and an upper arm support portion 133 for supporting respectively a lower arm 137 and an upper arm 138 of a rear wheel suspension system 136. Frontwardly and rearwardly extending flanges 134 having respective through-openings 134a are formed above each upper arm support portion 133. The rear suspension cross member 131 is securely mounted on the widened portions 115a of the medial cross member 115 via the nut plates 116 by means of bolts extending through the through-openings 134a of the flanges 134.

The widened portions 115a of the medial cross member 115 greatly enhance the bearing rigidity of the rear wheel suspension systems 136.

An upper portion of a differential unit 108 is securely mounted on a substantially U-shaped mounting member 119, which extends transversely and has rearwardly extending opposite ends carried by two brackets 118 rigidly secured to the front surface of the rear suspension cross member 131.

As shown in FIG. 7, each of the rear side frames 110 comprises a kick-up portion 111 rising diagonally toward the rear so as to correspond to the configuration of the floor panel, and a straight portion 112 extending substantially straight from the kick-up portion 111 toward the rear. A rear bumper (not shown) is securely mounted on the rear ends of the paired rear side frames 110 via a bumper bracket 123. The horizontal centerline of the bumper bracket 123 is preferably shifted below the horizontal neutral axes of the straight portions 112.

In this embodiment, each of the rear side frames 110 is reinforced by a reinforcing member 140 secured thereto. More specifically, each rear side frame 110 comprises an inner plate 110a having a substantially U-shaped cross section, which is preferably orientated with its open end outwardly as shown in FIG. 6. A medial closure plate 141 and a rear closure plate (not shown), both of which are steel plates formed by pressing, are secured to open ends of the inwardly curved portion 114 and the straight portion 112, respectively, to form a closed section. The reinforcing member 140 also has a U-shaped cross section and is secured inside the rear side frame inner plate 110a with its open end being directed outwardly as shown in FIG. 9.

Although not shown, the kick-up portion 111 of the rear side frame 110 is also reinforced by another reinforcing member separate from the reinforcing member 140. The closure plate 141 is preferably provided at its innermost portion with a protruding portion 141a protruding outwardly therefrom for the reinforcement of the inwardly curved portion 114, thereby preventing the inwardly curved portion 114 from being bent or deformed in the event of a rear-end collision.

The reinforcing member 140 extends from the rear end of the rear side frame 110 to the joint with the medial cross member 115 and the front end thereof is rigidly secured to the rear portion of such joint. As shown in FIG. 7, the reinforcing member 140 is preferably provided with a protrusion 140a at a location immediately behind the joint between the reinforcing member 140 and the medial cross member 115. Since the protrusion 140a causes the reinforcing member 140 to be discontinuous in strength or rigidity, the reinforcing member 140 is susceptible to bending at the location where the protrusion 140a is formed in the event of a rear-end collision.

Even if an automotive vehicle having the above-described rear body structure is subjected to a rear-end collision and an impact load is imposed upon the straight portion 112 of the rear side frame 110 via the rear bumper (not shown), the portion of the rear side frame 110 between the rear end thereof and the joint with the medial cross member 115, which is reinforced by the reinforcing member 140, is resistant to being bent or deformed.

On the other hand, because the rear side frame 110 is joined with the transversely extending medial cross member 115, such joint is greatly enhanced in strength and rigidity. Accordingly, the strength of the rear side frame 110 changes most greatly at a location immediately behind the joint, thus causing the rear side frame 110 to be easily bent at this location in the event of the rear-end collision.

In other words, the portion of the rear side frame 110 between the rear end thereof and the joint is resistant to being bent even in the event of the rear-end collision, and therefore, the fuel tank 109 mounted on this portion can be effectively protected.

It is noted that the position of the bending point at which the rear side frame 110 is bent can be shifted by changing the width of the widened portion 115a of the medial cross member 115.

The protrusion 140a of the reinforcing member 140 also causes the rear side frame 110 to be easily bent at a location immediately behind the joint with the medial cross member 115.

Furthermore, when an impact load is imposed upon the straight portion 112 of the rear side frame 110, the rear side frame 110 is crushed frontwardly so that the joint between the rear side frame 110 and the medial cross member 115 will be raised upwardly and the rear end of the straight portion 112 will be depressed, as shown by single-dotted chain lines in FIG. 8, under conditions at which the front end of the kick-up portion 111 is kept substantially unmoved. The reason for this is that the straight portion 112 is upwardly shifted from the fixed front end of the kick-up portion 111 and the portion of the rear side frame 110 immediately behind the joint acts as a bending point. In this event, since the differential unit 108 along with the rear suspension cross member 131, the bracket 118 and the transversely extending mounting member 119 is moved frontwardly upwardly, no collision takes place between the differential unit 108 and the fuel tank 109. Furthermore, the fact that the rear end of the rear side frame 110 is depressed prevents the fuel tank 109 from being damaged by the automotive vehicle which has caused the rear-end collision.

In addition, since the horizontal centerline of the bumper bracket 123 is vertically shifted below the horizontal neutral axis of the straight portion 112, an impact load generated by the rear-end collision produces a moment which so acts as to depress the rear end of the rear side frame 110, thereby ensuring the aforementioned manner of deformation.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile rear body structure comprising:
a pair of rear side frames extending in directions to be longitudinal of a vehicle body, each said rear side frame having a diagonally upwardly and rearwardly extending kick-up portion to form a bridge for a respective rear wheel zone;
a differential unit disposed substantially between said kick-up portions of said pair of rear side frames;
a fuel tank positioned rearwardly of sad differential unit; and
means for, in the event of a rear end collision with said rear body structure that tends to push said fuel tank forwardly, substantially avoiding damage to said fuel tank due to contact thereof with said differential unit, said means comprising a medial cross member extending transversely between said pair of rear side frames at a location immediately rearwardly of said differential unit and forwardly of said fuel tank, said differential unit being connected to said medial cross member, said medial cross member having opposite ends connected to respective said rear side frames at locations immediately rearwardly of said kick-up portions thereof, and said fuel tank being mounted to said rear frame members rearwardly of said medial cross member, such that in the event of a rear-end collision said medial cross member is pushed forwardly and thereby moves said differential unit forwardly, thus avoiding contact of the forwardly moving fuel tank with said differential unit.

2. A structure as claimed in claim 1, further comprising a pair of rear drive shafts extending transversely from said differential unit and located below respective said kick-up portions, for driving respective rear wheels.

3. A structure as claimed in claim 1, wherein a rear flange of said differential unit is mounted on a lower surface of said medial cross member.

4. An automobile rear body structure comprising:
a pair of rear side frames extending in directions to be longitudinal of a vehicle body, each said rear side frame having a diagonally upwardly and rearwardly extending kick-up portion to form a bridge for a respective rear wheel zone;
a differential unit disposed substantially between said kick-up portions of said pair of rear side frames;

a fuel tank positioned rearwardly of said differential unit;

a rear suspension cross member for carrying rear wheel suspension systems; and means for, in the event of a rear end collision with said rear body structure that tends to push said fuel tank forwardly, substantially avoiding damage to said fuel tank due to contact thereof with said differential unit, said means comprising a medial cross member extending transversely between said pair of rear side frames at a location immediately rearwardly of said differential unit and forwardly of said fuel tank, said rear suspension cross member extending below and along and being secured to a lower surface of said medial cross member, said differential unit being secured to said rear suspension cross member, and said medial cross member having opposite ends connected to respective said rear side frames at locations immediately rearwardly of said kick-up portions thereof, such that in the event of a rear-end collision said medial cross member is pushed forwardly and thereby moves said differential unit forwardly, thus avoiding contact of the forwardly moving fuel tank with said differential unit.

5. A structure as claimed in claim 4, wherein opposite ends of said rear suspension cross member extend downwardly for carrying the rear wheel suspension systems.

6. A structure as claimed in claim 4, further comprising a substantially U-shaped mounting member extending in a direction to be transverse of the vehicle body and having rearwardly extending opposite ends secured to a front surface of said rear suspension cross member, said differential unit being fastened to a lower surface of said mounting member.

7. A structure as claimed in claim 1, wherein each said rear side frame includes a kick-down portion extending diagonally downwardly and rearwardly from the respective said kick-up portion thereof.

8. A structure as claimed in claim 7, wherein said fuel tank and portions of said rear side frames located behind said kick-down portions thereof are located substantially on the same level.

9. A structure as claimed in claim 4, further comprising a pair of rear drive shafts extending transversely from said differential unit and located below respective said kick-up portions, for driving respective rear wheels.

* * * * *